(12) United States Patent
Yamashita et al.

(10) Patent No.: US 8,015,447 B2
(45) Date of Patent: Sep. 6, 2011

(54) PROCESSOR DEBUGGING APPARATUS AND PROCESSOR DEBUGGING METHOD

(75) Inventors: Hideo Yamashita, Kawasaki (JP); Ryuji Kan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 10/986,912

(22) Filed: Nov. 15, 2004

(65) Prior Publication Data

US 2006/0026470 A1 Feb. 2, 2006

(30) Foreign Application Priority Data

Jul. 29, 2004 (JP) .................................. 2004-222398

(51) Int. Cl.
*G06F 11/00* (2006.01)
(52) U.S. Cl. .......................................................... 714/30
(58) Field of Classification Search .................. 714/724, 714/38, 30; 712/227
See application file for complete search history.

(56) References Cited

U.S. PATENT DOCUMENTS

| | | | | |
|---|---|---|---|---|
| 4,115,851 A | * | 9/1978 | Nagano et al. | 711/109 |
| 4,720,778 A | * | 1/1988 | Hall et al. | 714/38 |
| 5,122,738 A | * | 6/1992 | Simpson et al. | 324/158.1 |
| 5,253,255 A | * | 10/1993 | Carbine | 714/734 |
| 5,361,348 A | * | 11/1994 | Nakamoto | 714/38 |
| 5,819,025 A | | 10/1998 | Williams | 395/183.06 |
| 5,943,498 A | * | 8/1999 | Yano et al. | 717/128 |
| 6,154,856 A | * | 11/2000 | Madduri et al. | 714/27 |
| 6,463,553 B1 | * | 10/2002 | Edwards | 714/38 |
| 6,523,136 B1 | * | 2/2003 | Higashida | 714/30 |
| 6,550,031 B1 | * | 4/2003 | Godfrey et al. | 714/726 |
| 6,859,891 B2 | * | 2/2005 | Edwards et al. | 714/30 |
| 2002/0078420 A1 | * | 6/2002 | Roth et al. | 714/798 |
| 2003/0115506 A1 | * | 6/2003 | Edwards et al. | 714/38 |
| 2007/0006040 A1 | * | 1/2007 | Carrie et al. | 714/38 |

FOREIGN PATENT DOCUMENTS

| | | |
|---|---|---|
| JP | 58-169643 | 10/1983 |
| JP | 60-159951 | 8/1985 |
| JP | 5-242272 | 9/1993 |
| JP | 6-174796 | 6/1994 |
| JP | 7-182305 | 7/1995 |
| JP | 08-171505 | 7/1996 |
| JP | 2002-149442 | 5/2002 |

OTHER PUBLICATIONS

Japanese Office Action date Mar. 4, 2008 for JP 2004-222398.

* cited by examiner

*Primary Examiner* — Amine Riad
(74) *Attorney, Agent, or Firm* — Staas & Halsey LLP

(57) ABSTRACT

A processor debugging apparatus that scans and reads a latch in a processor includes a register that stores a value of a predetermined signal in the processor for a plurality of clocks; and a signal reading unit that scans and reads out a signal value stored in the register.

13 Claims, 14 Drawing Sheets

FIG.1A
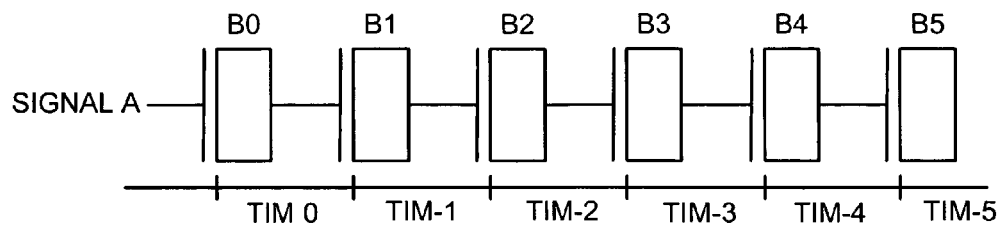
FIG.1B
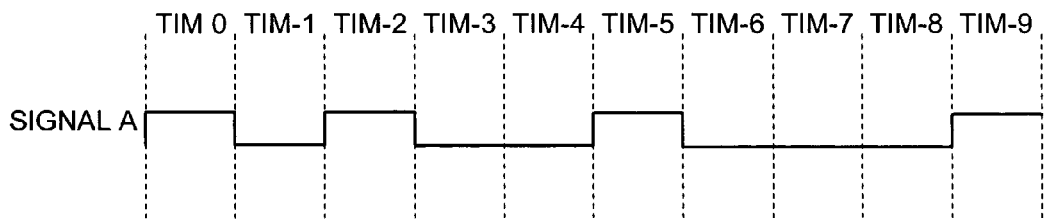
FIG.1C
|  | SIGNAL A | RECORDING TIMING |
|---|---|---|
| REGISTER(B0) | 1 | TIM 0 |
| REGISTER(B1) | 0 | TIM-1 |
| REGISTER(B2) | 1 | TIM-2 |
| REGISTER(B3) | 0 | TIM-3 |
| REGISTER(B4) | 0 | TIM-4 |
| REGISTER(B5) | 1 | TIM-5 |

FIG.3
OPCODE<3:0>
- 000   nop
- 001   ADD
- 010   SUB
- 011   MULT
- 100   DIV
- 101   SQRT
- 110   SHIFT_LEFT
- 111   SHIFT_RIGHT
FIG.4
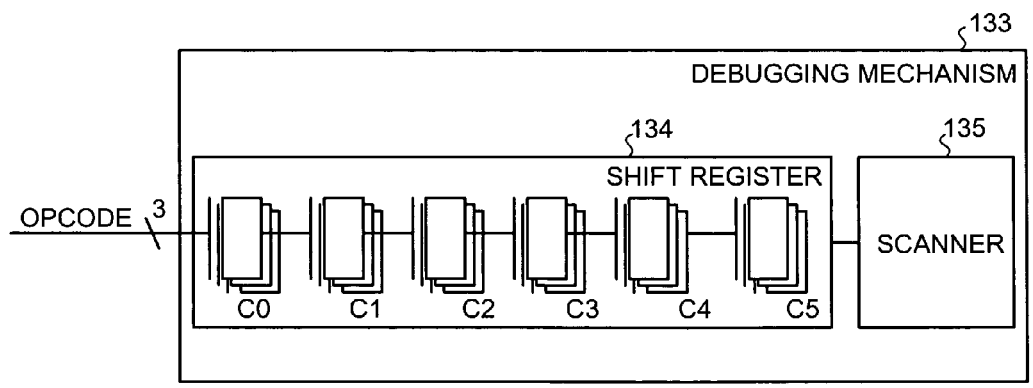
FIG.5
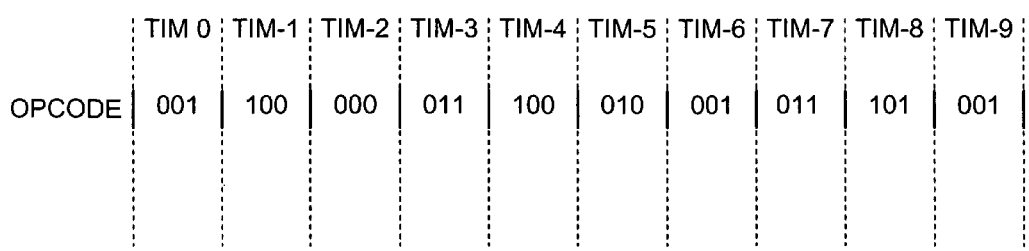

|  | OPCODE | RECORDING TIMING |
|---|---|---|
| REGISTER(C0) | 001 (ADD) | TIM 0 |
| REGISTER(C1) | 100 (DIV) | TIM-1 |
| REGISTER(C2) | 000 (NOP) | TIM-2 |
| REGISTER(C3) | 011 (MULT) | TIM-3 |
| REGISTER(C4) | 100 (DIV) | TIM-4 |
| REGISTER(C5) | 010 (SUB) | TIM-5 |

FIG.8A
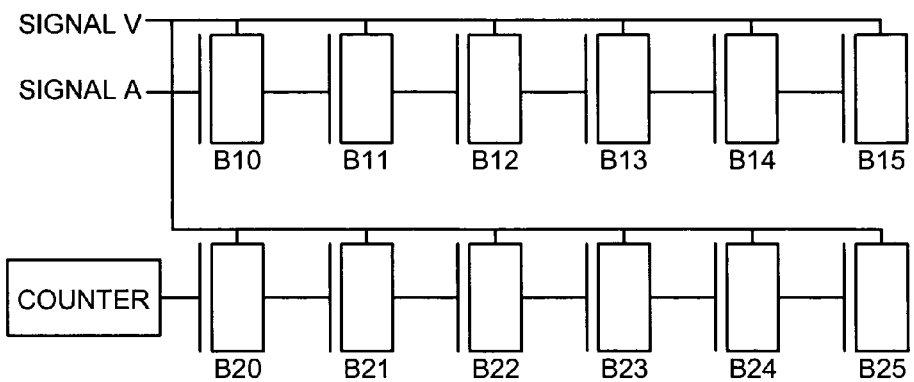
FIG.8B
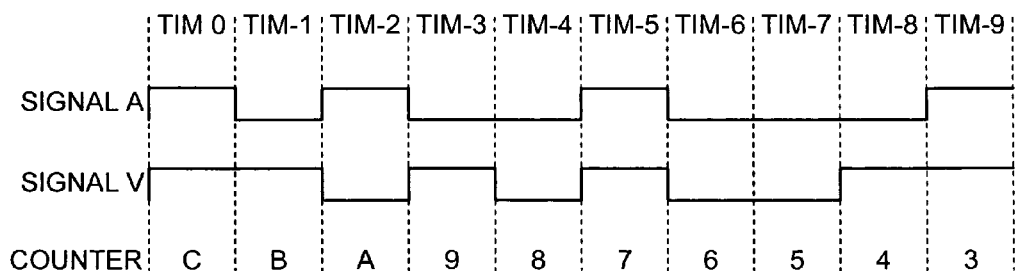
FIG.8C
|  | SIGNAL A |  | COUNTER VALUE | RECORDING TIMING |
|---|---|---|---|---|
| REGISTER(B10) | 1 | REGISTER(B20) | C | TIM 0 |
| REGISTER(B11) | 0 | REGISTER(B21) | B | TIM-1 |
| REGISTER(B12) | 0 | REGISTER(B22) | 9 | TIM-3 |
| REGISTER(B13) | 1 | REGISTER(B23) | 7 | TIM-5 |
| REGISTER(B14) | 0 | REGISTER(B24) | 4 | TIM-8 |
| REGISTER(B15) | 1 | REGISTER(B25) | 3 | TIM-9 |

|  | OPCODE |  | COUNTER VALUE | RECORDING TIMING |
|---|---|---|---|---|
| REGISTER(C10) | 001 (ADD) | REGISTER(C20) | C | TIM 0 |
| REGISTER(C11) | 100 (DIV) | REGISTER(C21) | B | TIM-1 |
| REGISTER(C12) | 011 (MULT) | REGISTER(C22) | 9 | TIM-3 |
| REGISTER(C13) | 010 (SUB) | REGISTER(C23) | 7 | TIM-5 |
| REGISTER(C14) | 101 (SQRT) | REGISTER(C24) | 4 | TIM-8 |
| REGISTER(C15) | 001 (ADD) | REGISTER(C25) | 3 | TIM-9 |

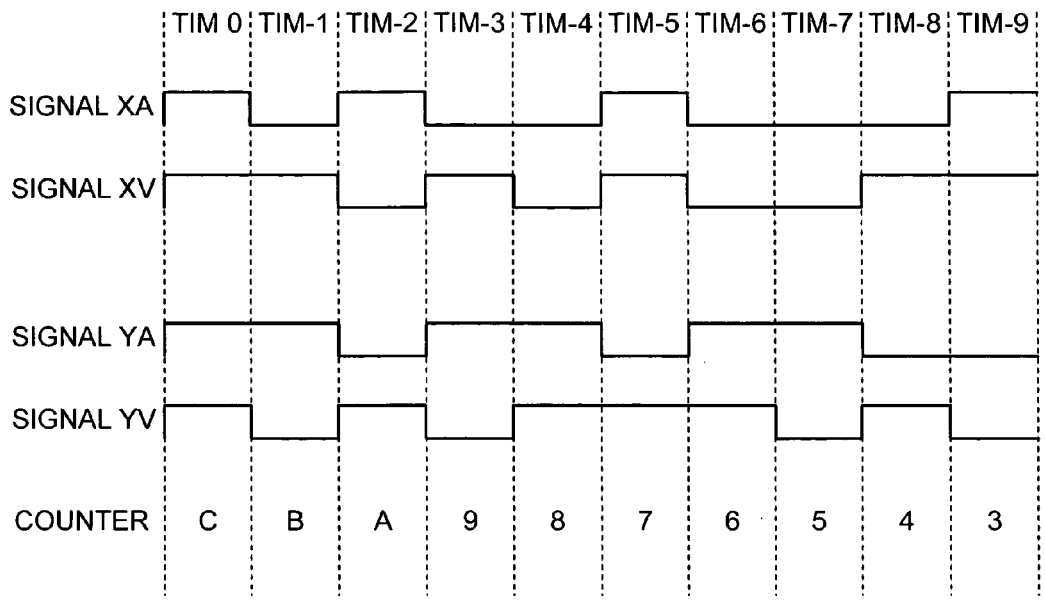

FIG.16

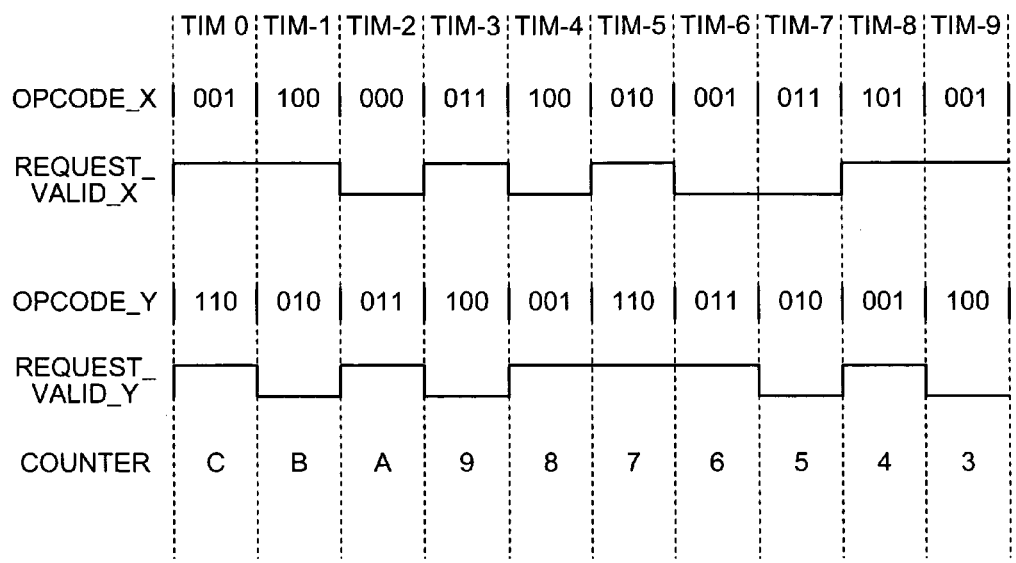

FIG.17

|  | OPCODE_X | REGISTER(C40) | COUNTER VALUE | RECORDING TIMING |
|---|---|---|---|---|
| REGISTER(C30) | 001 (ADD) | REGISTER(C40) | C | TIM 0 |
| REGISTER(C31) | 100 (DIV) | REGISTER(C41) | B | TIM-1 |
| REGISTER(C32) | 011 (MULT) | REGISTER(C42) | 9 | TIM-3 |
| REGISTER(C33) | 010 (SUB) | REGISTER(C43) | 7 | TIM-5 |
| REGISTER(C34) | 101 (SQRT) | REGISTER(C44) | 4 | TIM-8 |
| REGISTER(C35) | 001 (ADD) | REGISTER(C45) | 3 | TIM-9 |
|  |  |  | COUNTER VALUE | RECORDING TIMING |
| REGISTER(C50) | 110 (SHIFT_LEFT) | REGISTER(C60) | C | TIM 0 |
| REGISTER(C51) | 011 (MULT) | REGISTER(C61) | A | TIM-2 |
| REGISTER(C52) | 001 (ADD) | REGISTER(C62) | 8 | TIM-4 |
| REGISTER(C53) | 110 (SHIFT_LEFT) | REGISTER(C63) | 7 | TIM-5 |
| REGISTER(C54) | 011 (MULT) | REGISTER(C64) | 6 | TIM-6 |
| REGISTER(C55) | 001 (ADD) | REGISTER(C65) | 4 | TIM-8 |

US 8,015,447 B2

PROCESSOR DEBUGGING APPARATUS AND PROCESSOR DEBUGGING METHOD

BACKGROUND OF THE INVENTION

1) Field of the Invention

The present invention relates to a processor debugging apparatus and a processor debugging method for scanning and reading a latch in a processor, and more particularly, to a processor debugging apparatus and a processor debugging method that can grasp a sequential transition of a signal in a processor to improve a debugging efficiency.

2) Description of the Related Art

Recently, the integration scale of a processor is increasing and the logics inside the processor are becoming more complex. The complication of logics makes a debugging work of the processor difficult, and makes the debugging time longer. Therefore, various measures are taken to improve the debugging efficiency of the processor.

One of the measures is a scheme of adding a scan circuit to a latch in a processor compatible with the JTAG (Joint Test Action Group) and reading information from the latch (for the JTAG, see IEEE 1349.1 "Test Access Port and Boundary Scan Architecture", IEEE Standard). In this scheme, the status of the processor can be recognized from outside by examining scanned values, thereby increasing the debugging efficiency. However, the examination of the scanned values merely detects the status of one clock timing and therefore the sequential transition of a signal in the processor cannot be recognized, and as a result, it is difficult to analyze a timing failure that may occur due to a relation between before and after the signal value.

In order to solve the problem, a designer adds, in advance, a processor with a circuit that records signals important for examination in an exclusive random access memory (RAM) at every timing, and examines the values of a plurality of past cycles recorded in the RAM. The amount of information to be recorded and the number of clocks vary depending on the capacity of the used RAM, but several hundred cycles of information are recorded to demonstrate an effect in debugging a timing failure.

However, since the recording capacity of a RAM is determined to, for example, 1 kilobit (Kb), 2 Kb, a designer mounts debugging mechanisms more than the number of signals actually needed and adds a diagnosis circuit to test the operation of the RAM itself. This increases the circuit scale, the number of design steps, and eventually the cost.

Since the RAM is configured by exclusive micro-scale transistors, it is prone to generate problems in fabrication as compared with logics. The mounting of the RAM only for the debugging leads to reduction in the yield of a large scale integration (LSI).

Therefore, the RAM for the debugging purpose is used only at a location where 100 cycles of information are needed for debugging, such as a command control unit or a memory control unit. Such a RAM is not provided in an operation executing unit or the like that does not need 100 cycles of information, and debugging is executed only with latch scanned information alone.

However, with only the scanned information, the operation of the operation executing unit is predicted only from the status of a timing of the information, so that the sequential transitional statuses of the internal circuits of the operation executing unit cannot be recognized, which makes the debugging work of the operation executing unit difficult.

SUMMARY OF THE INVENTION

It is an object of the present invention to solve at least the above problems in the conventional technology.

A processor debugging apparatus, which scans and reads a latch in a processor, according to one aspect of the present invention includes a register that stores a value of a predetermined signal in the processor for a plurality of clocks; and a signal reading unit that scans and reads out a signal value stored in the register.

A processor debugging method, which is for scanning and reading a latch in a processor, according to another aspect of the present invention includes storing a value of a predetermined signal in the processor for a plurality of clocks in a register; and scanning and reading out a signal value stored in the register.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1A is a schematic for illustrating a signal recording method of a processor debugging apparatus according to a first embodiment of the present invention (a shift register to record a signal);

FIG. 1B is a schematic for illustrating the signal recording method of the processor debugging apparatus according to the first embodiment (a signal to be recorded);

FIG. 1C is a schematic for illustrating the signal recording method of the processor debugging apparatus according to the first embodiment (a signal to be recorded in the shift register);

FIG. 3 is a list of an example of allocation of a 3-bit OPCODE;

FIG. 4 is a block diagram of a debugging mechanism according to the first embodiment;

FIG. 5 is a schematic of an example of values at each of timings of the OPCODE;

FIG. 8A is a schematic for illustrating a signal recording method of a processor debugging apparatus according to a second embodiment of the present invention (a shift register that records a signal and a shift register that records a counter value);

FIG. 8B is a schematic for illustrating a signal recording method of a processor debugging apparatus according to the second embodiment (a signal to be recorded and a signal indicating a validity of the signal);

FIG. 8C is a schematic for illustrating a signal recording method of a processor debugging apparatus according to the second embodiment (a signal and a counter value to be respectively recorded in two shift registers);

FIG. 13B is a schematic for illustrating a signal recording method of a processor debugging apparatus according to the third embodiment (two signals to be recorded and two signals respectively indicating a validity of the two signals);

FIG. 13C a schematic for illustrating a signal recording method of a processor debugging apparatus according to the third embodiment (signals to be respectively recorded in the four shift registers);

FIG. 16 is a schematic of an example of values at each of timings of an OPCODE_X, an OPCODE_Y, a REQUEST_VALID_X, and a REQUEST_VALID_Y;

FIG. 17 is a table of an example of values at each of timings of the OPCODE_X, a counter value, the OPCODE_Y, and a counter value respectively recorded in the four shift registers;

DETAILED DESCRIPTION

Exemplary embodiments of a processor debugging apparatus and a processor debugging method according to the present invention will be explained in detail with reference to the accompanying drawings.

A signal recording method of a processor debugging apparatus according to a first embodiment of the present invention will be described with reference to FIGS. 1A to 1C. FIG. 1A depicts a shift register ("B0" to "B5") that records information of a signal A over the past six cycles. The processor debugging apparatus according to the first embodiment records the signal A in a processor using the shift register.

Given that "TIM 0" is a timing at which the value of the signal A is read out through scanning, the value of the signal A at "TIM 0" is recorded in the register "B0", the value of the signal A at "TIM-1", which is a timing one clock before "TIM 0", is recorded in the register "B1", the value of the signal A at "TIM-2", which is a timing two clocks before "TIM 0", is recorded in the register "B2", and likewise the values of the signals A three clocks, four clocks, and five clocks before "TIM 0" are respectively recorded in the registers "B3", "B4", and "B5".

For example, when a signal A in one circuit has changed over ten clocks from "TIM-9" to "TIM 0" as shown in FIG. 1B, the values that are recorded in the shift register then are as shown in FIG. 1C.

With the processor debugging apparatus according to the first embodiment, therefore, designers can recognize the statuses of the signal A over six cycles from "TIM-5" to "TIM 0" shown in FIG. 1B by examining the values in the shift register, and can execute debugging efficiently.

Figure 2:
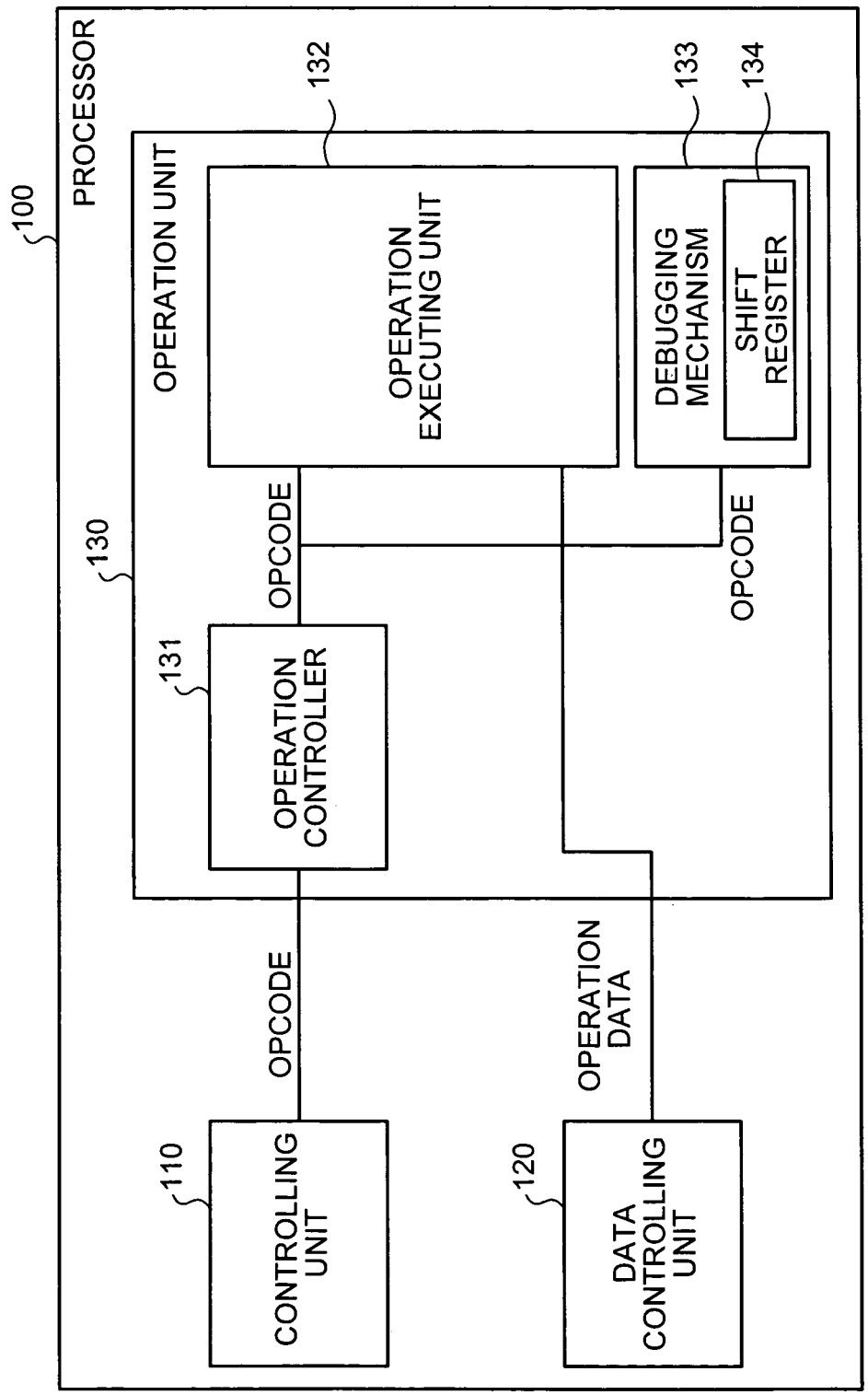
FIG. 2 is a block diagram of a processor according to the first embodiment.

FIG. 2 is a block diagram of a processor 100 according to the first embodiment. A processor 100 has a command control unit 110, a data control unit 120, and an operation unit 130.

The command control unit 110 controls execution of commands, and instructs an operation to be executed to the operation unit 130 using a 3-bit signal OPCODE. FIG. 3 is a list of an example of allocation of the 3-bit OPCODE. As shown in the diagram, eight types of operations from "nop" to "SHIFT_RIGHT" are allocated to the 3-bit OPCODE.

The data control unit 120 performs control associated with data that is to be subjected to, an operation in the operation unit 130, and outputs operation data to the operation unit 130.

The operation unit 130 performs an operation, instructed by the command control unit 110 by the OPCODE, on the operation data received from the data control unit 120. The operation unit 130 has an operation controller 131, an operation executing unit 132, and a debugging mechanism 133.

The operation controller 131 controls the operation executing unit 132 according to a control signal from the command control unit 110. The operation executing unit 132 performs an operation on operation data from the data control unit 120 according to a control signal from the operation controller 131.

The debugging mechanism 133 provides a function of assisting debugging of the processor 100. Specifically, the debugging mechanism 133 receives the OPCODE from the operation controller 131, and records its value in a shift register 134. FIG. 4 is a block diagram of a debugging mechanism 133 according to the first embodiment. The debugging mechanism 133 has the shift register 134 and a scanner 135.

The shift register 134 stores the values of the OPCODE over the past six cycles. Specifically, a register "C0" stores the latest OPCODE, a register "C1" stores the OPCODE of one clock before, a register "C2" stores the OPCODE of two clocks before, and so forth. That is, the shift register 134 stores the value of the latest OPCODE and the values of the OPCODE up to five cycles before.

Figures 6, 7:
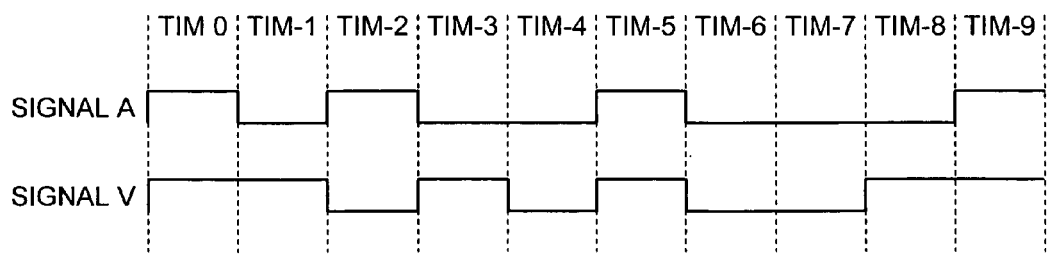
FIG. 6 is a table of the OPCODE recorded in the shift register.
FIG. 7 is a schematic of a signal A and a signal V indicating a validity of the signal A.

It is assumed herein that the OPCODE has been sent to the operation unit 130 from the command control unit 110 at timings as shown in FIG. 5. The values of the OPCODE held then in the shift register 134 in the debugging mechanism 133 and their timings are shown in FIG. 6. The values of the OPCODE over the past six cycles from "TIM 0" to "TIM-5" are recorded in the shift register 134 as shown in FIG. 6.

Since the values of the OPCODE over the past six cycles are recorded in the shift register 134 this way, designers can recognize that operation control signals have been sent from the command control unit 110 in the order of SUB→DIV→MULT→NOP→DIV→ADD over the past six cycles, and can efficiently perform debugging.

The scanner 135 scans and reads values stored in the shift register 134, which enables designers to recognize the values of the OPCODE over the past six cycles.

As described above, according to the first embodiment, since the debugging mechanism 133 stores the values of the OPCODE over the past six cycles in the shift register 134, and the scanner 135 scans and reads the values of the OPCODE stored in the shift register 134, designers can recognize the sequential transition of the OPCODE and can efficiently debugging the processor.

With this configuration, the sequential transition of signals in the processor can be recognized from outside, without lowering the yield in production and the reliability, with addition of a simple circuit, and can improve the debugging work of the processor.

Although the shift register has six stages of registers in the first embodiment, a shift register with a different stage structure can also be used. Other signals than the OPCODE may also be recorded in the shift register.

The processor debugging apparatus that records all the OPCODEs over the past six cycles in the shift register 134 is explained in the first embodiment. However, sometimes, only the OPCODE of a specific cycle, not the OPCODEs over all the cycles, is required to be recognized.

For example, FIG. 7 is a schematic of a signal A and a signal V indicating a validity of the signal A. In the example shown in FIG. 7, it is assumed that the value of the signal A is valid only when the value of the signal V is "1". In this instance, the signal A at timings "TIM-2", "TIM-4", "TIM- 6", and "TIM-7" are invalid, so that the values of the signal A at those timings are not significant if recorded in the shift register of the debugging mechanism.

Therefore, one way of effectively using the limited resources of the debugging mechanism is to store the value of the signal A only when the value of the signal V is "1". A processor debugging apparatus that records the value of a specific signal in the shift register only when the value of one signal is "1" is explained in a second embodiment of the present invention.

A signal recording method of the processor debugging apparatus according to the second embodiment will first be described with reference to FIGS. 8A to 8C. FIG. 8A depicts a shift register ("B10" to "B15") that records information of a signal A over the past six cycles.

The shift register ("B10" to "B15"), unlike the shift register ("B0" to "B5"), is controlled in such a way as to record the value of the signal A only when the value of the signal V is "1". The processor debugging apparatus according to the second embodiment is newly provided with a 4-bit counter that cyclically counts every cycle and whose counter value is also recorded in another shift register ("B20" to "B25") at the same timing as the recording of the signal A.

Since the counter value is recorded in the shift register ("B20" to "B25") at the same timing as the recording of the signal A, it is possible to relatively specify the timing at which the signal A is recorded by using the counter value.

FIG. 8B depicts an example where the values of the counter are added to changes in the statuses of the signals A and V shown in FIG. 7. The values of the counter relatively indicate the timings of the signals A and V. It is assumed herein that the counter value is H'C' ('C' in the hexadecimal notation) at the timing "TIM 0". The values of the signal A and the counter stored in the respective shift registers in the debugging mechanism, and their recording timings are shown in FIG. 8C.

Designers can recognize the sequential transition of the signal A shown in FIG. 8B by examining the values of the signal A recorded in the shift register ("B10" to "B15") and the counter values recorded in the shift register ("B20" to "B25") at the same timings. Since designers can recognize the statuses over ten cycles from "TIM-9" to "TIM 0", debugging can be performed efficiently.

Figure 9:
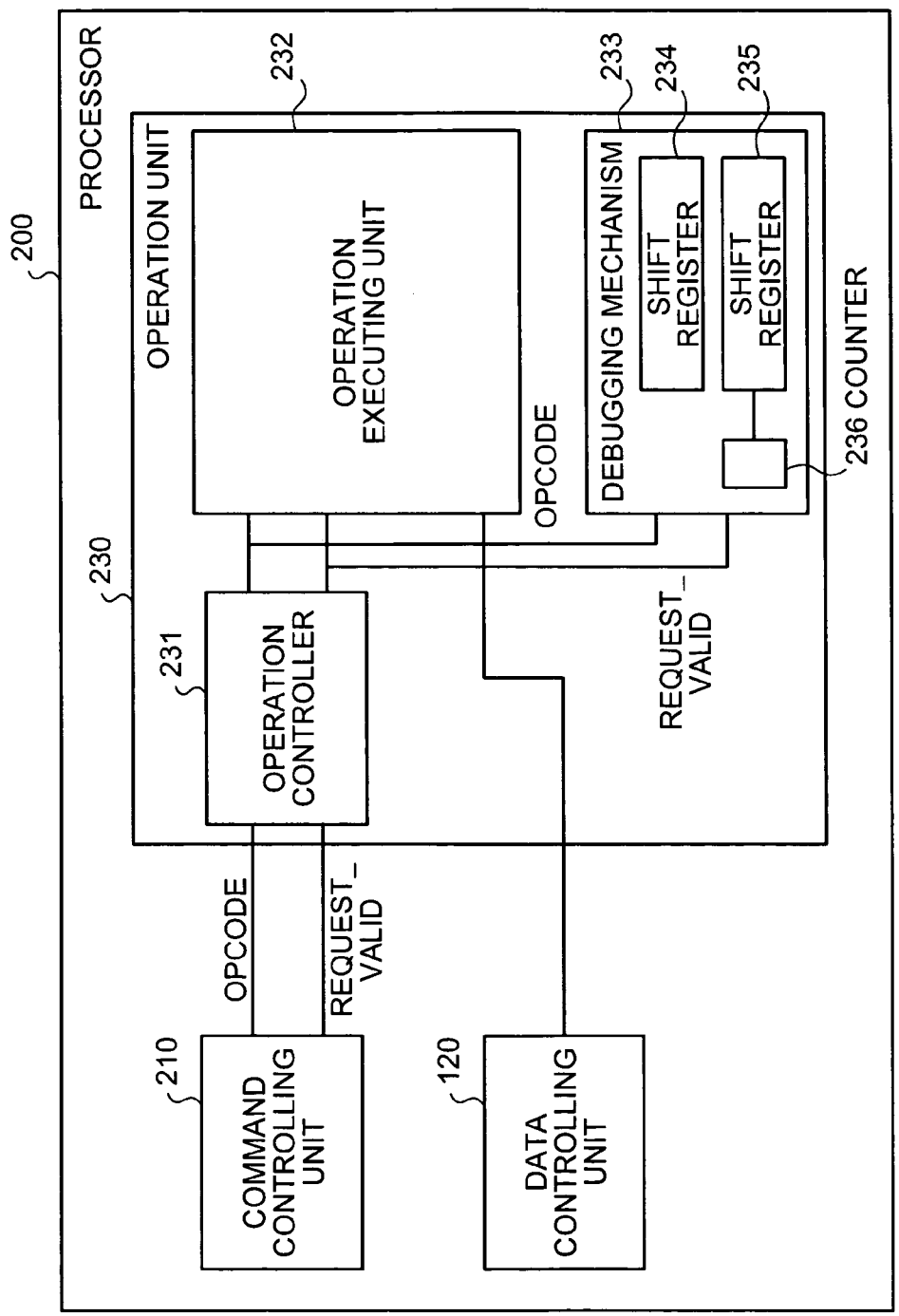
FIG. 9 is a block diagram of a processor according to the second embodiment.

FIG. 9 is a block diagram of a processor 200 according to the second embodiment. For the sake of descriptive convenience and to avoid the redundant detailed description, in FIG. 9, like reference numerals designate like functional parts as those shown in FIG. 2.

As shown in FIG. 9, a processor 200 has a command control unit 210, a data control unit 120, and an operation unit 230. The command control unit 210 controls execution of commands as does the command control unit 110, but sends a signal REQUEST_VALID to the operation unit 230 in addition to the OPCODE. The signal REQUEST_VALID indicates the validity of the OPCODE, which is valid only when the REQUEST_VALID is "1".

The operation unit 230, like the operation unit 130, performs an operation, and has an operation controller 231, an operation executing unit 232, and a debugging mechanism 233. The operation controller 231 receives the REQUEST_VALID in addition to the OPCODE from the command control unit 210 as control signals, and controls the operation executing unit 232. The operation executing unit 232 performs an operation on operation data from the data control unit 120 according to the control signals from the operation controller 231.

The debugging mechanism 233 provides a function of assisting debugging of the processor 200. The debugging mechanism 233 receives the REQUEST_VALID in addition to the OPCODE from the operation controller 231, and records the OPCODE when the REQUEST_VALID is "1" in a shift register 234.

Figure 10:
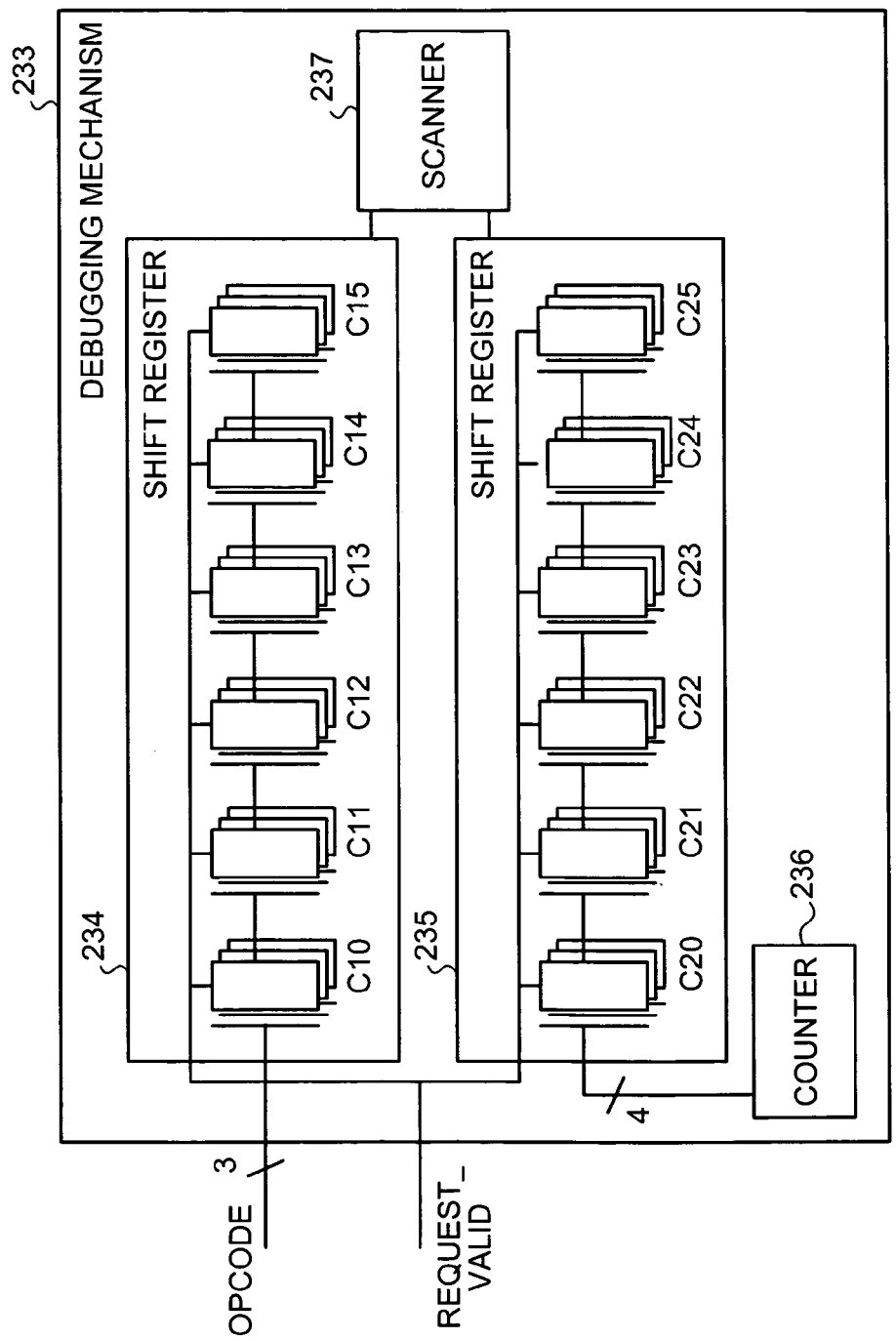
FIG. 10 is a block diagram of a debugging mechanism according to the second embodiment.

FIG. 10 is a block diagram of a debugging mechanism 233 according to the second embodiment. As shown in the diagram, the debugging mechanism 233 has the shift register 234, a shift register 235, a counter 236, and a scanner 237.

The shift register 234 receives the OPCODE and the REQUEST_VALID and stores the value of the OPCODE only when the REQUEST_VALID is "1". The counter 236 is a 4-bit counter that cyclically counts H'0' to H'F' every cycle, and is used to specify the timing at which the OPCODE is recorded in the shift register 234.

The shift register 235 stores the value of the counter 236 only when the REQUEST_VALID is "1" or at the timing when the OPCODE is recorded in the shift register 234. The scanner 237 scans and reads the values stored in the shift registers 234 and 235.

Figures 11, 12:
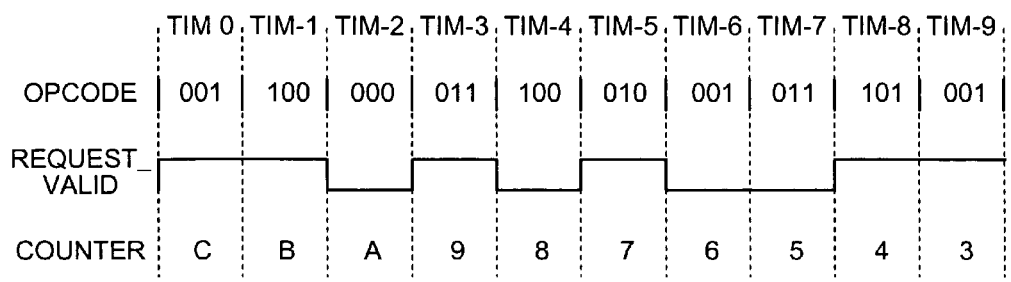
FIG. 11 is a schematic of an example of values at each of timings of an OPCODE and a REQUEST_VALID.
FIG. 12 is a table of the OPCODE and a counter value respectively recorded in two shift registers.

It is assumed herein that that the OPCODE and the REQUEST_VALID have been sent to the operation unit 230 from the command control unit 210 at timings as shown in FIG. 11. The values of the OPCODE and the counter values held then in the shift registers 234 and 235 in the debugging mechanism 233 and their timings are shown in FIG. 12.

As shown in FIG. 12, the values of the OPCODE at "TIM 0", "TIM-1", "TIM-3", "TIM-5", "TIM-8", and "TIM-9" when the REQUEST_VALID is "1" are recorded in the shift register 234, and the counter values at "TIM 0", "TIM-1", "TIM-3", "TIM-5", "TIM-8", and "TIM-9" are recorded in the shift register 235. By examining the values recorded in the shift registers 234 and 235 in the debugging mechanism 233, therefore, designers can recognize that valid operation control signals have been sent from the command control unit 210 in the order of ADD→SQRT→SUB→MULT→DIV→ADD over the past six cycles of the ten cycles, and operations have been performed in the operation executing unit 232, thereby ensuring more efficient debugging.

As described above, according to the second embodiment, the debugging mechanism 233 receives the REQUEST_VALID in addition to the OPCODE and stores the value of the OPCODE in the shift register 234 only when the REQUEST_VALID is "1", so that only valid information is stored in the shift register 234, thus ensuring efficient use of the shift register 234.

Although a single operation unit is present in a single processor in the first and the second embodiments, a plurality of operation units are located in a single processor of a superscalar type or the like. In a third embodiment of the present invention, two operation units are present in a processor. Note that each operation unit has a shift register that records signals.

Figure 13A:
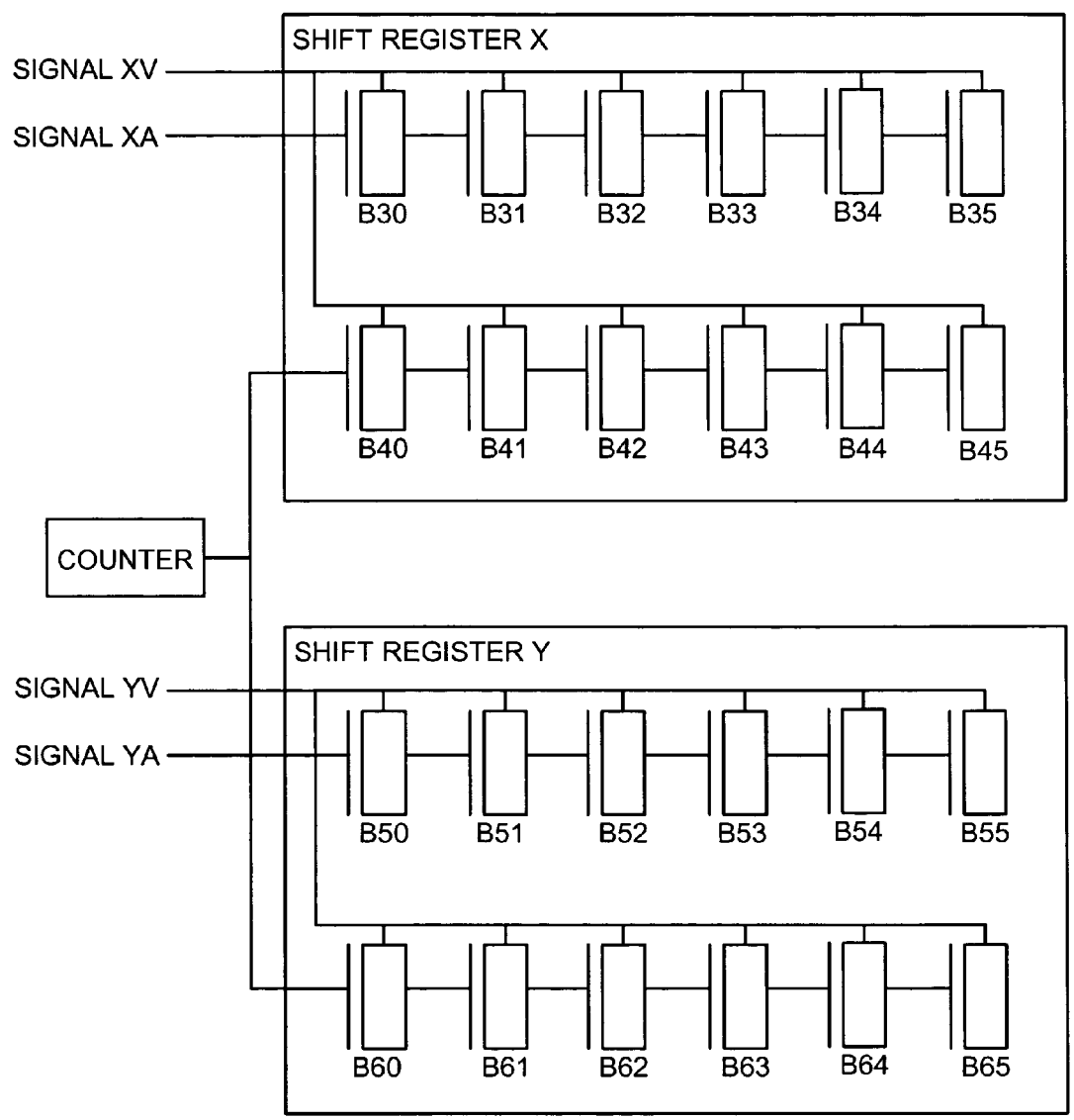
FIG. 13A is a schematic for illustrating a signal recording method of a processor debugging apparatus according to a third embodiment of the present invention (four shift registers that respectively record two signals and two counter values)

A signal recording method of a processor debugging apparatus according to the third embodiment will be described with reference to FIGS. 13A to 13C. As shown in FIG. 13A, it is assumed herein that signals XA and YA are recorded in shift registers ("B30" to "B35") and ("B50" to "B55") in shift registers X and Y only when signals XV and YV are "1" indicating that the signals XA and YA are valid. A counter common to both shift registers X and Y is provided and is controlled in such a way that the counter value is also recorded in shift registers ("B40" to "B45") and ("B60" to "B65") at the same timings as the recording of the signals XA and YA.

For example, it is assumed that the signals XA, YA, XV, and YV have been changed over ten clocks from "TIM-9" to "TIM 0" as shown in FIG. 13B and the counter value at the timing "TIM 0" is H'C'. The values of the signals XA and YA and the counter values recorded then in the respective shift registers are shown in FIG. 13C.

By examining the values recorded in the shift registers ("B30" to "B35"), ("B40" to "B45"), ("B50" to "B55"), and ("B60" to "B65"), therefore, designers can recognize the sequential transition of the signals XA and YA in FIG. 13B, namely, the statuses of the signal XA over ten cycles from "TIM-9" to "TIM 0", and the statuses of the signal YA over nine cycles from "TIM-8" to "TIM 0", and recognize the statuses of the simultaneously execution of operations in both operation executing units.

Figure 14:
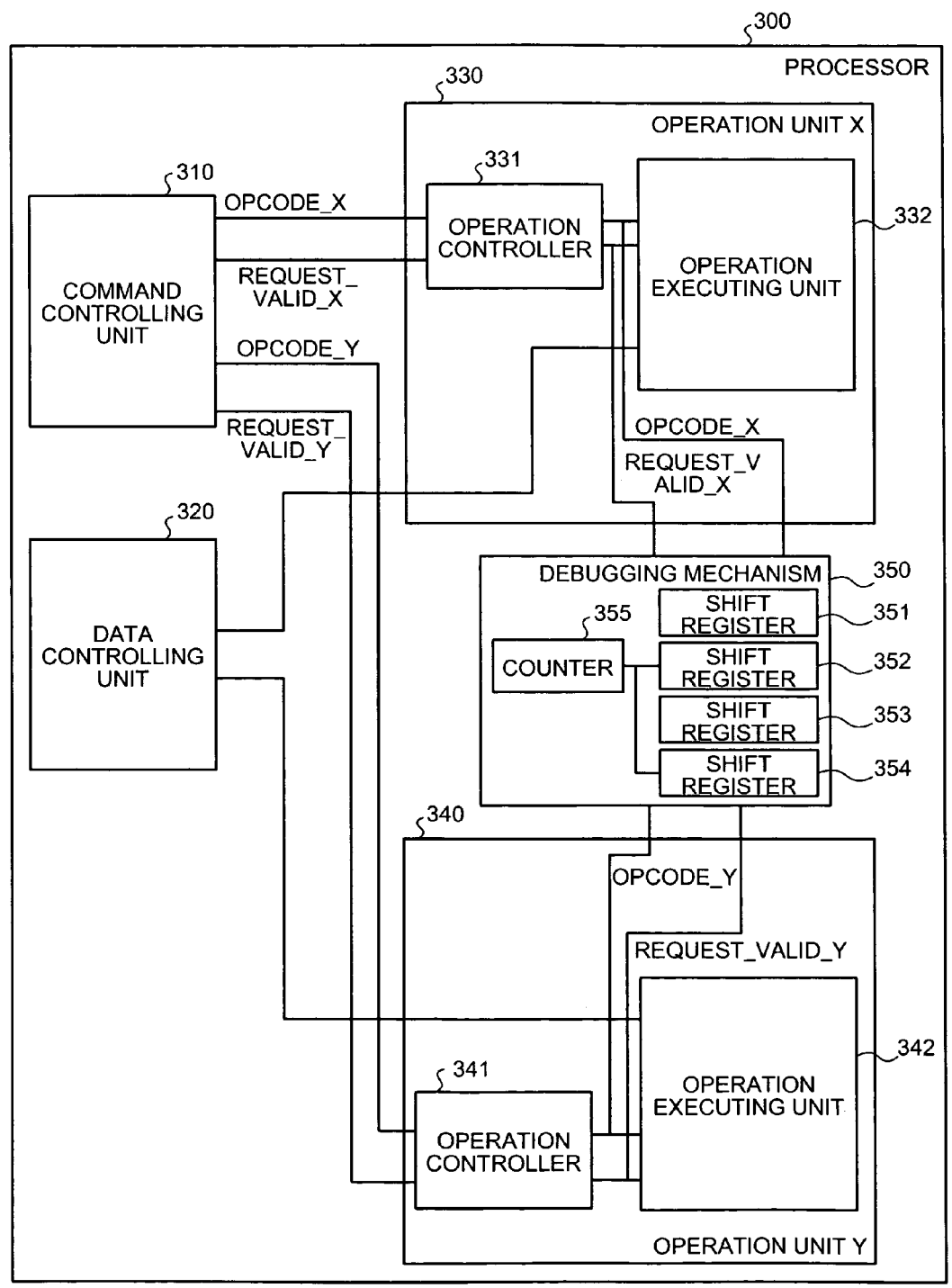
FIG. 14 is a block diagram of a processor according to the third embodiment.

FIG. 14 is a block diagram of a processor 300 according to the third embodiment. For the sake of descriptive convenience and to avoid the redundant detailed description, in FIG. 14, like reference numerals designate like functional parts as those shown in FIG. 2.

As shown in FIG. 14, the processor 300 has a command control unit 310, a data control unit 320, an operation unit X330, an operation unit Y340, and a debugging mechanism 350.

The command control unit 310 controls execution of commands, sends signals OPCODE_X and REQUEST_VALID_X to the operation unit X330, and sends signals OPCODE_Y and REQUEST_VALID_Y to the operation unit Y340.

The OPCODE_X and the OPCODE_Y are 3-bit signals that indicate operations and are allocated in the same way as the 3-bit OPCODE shown in FIG. 3. The signal REQUEST_VALID_X indicates the validity of the OPCODE_X, which is valid only when the REQUEST_VALID_X is "1", and the signal REQUEST_VALID_Y indicates the validity of the OPCODE_Y, which is valid only when the REQUEST_VALID_Y is "1".

The data control unit 320 performs control associated with data that is subjected to operations in the operation units X330 and Y340, and sends operation data to the operation units X330 and Y340.

The operation unit X330 performs an operation, instructed by the command control unit 310, on operation data received from the data control unit 320. The operation unit X330 has an operation controller 331, and an operation executing unit 332.

The operation controller 331 receives the OPCODE_X and the REQUEST_VALID_X from the command control unit 310, and controls the operation executing unit 332. The operation executing unit 332 performs an operation on operation data from the data control unit 320 according to the control signals from the operation controller 331. The operation unit Y340 has a functional configuration similar to that of the operation unit X330.

The debugging mechanism 350 provides a function of assisting debugging of the processor 300. The debugging mechanism 350 receives the OPCODE_X and the REQUEST_VALID X from the operation controller 331, records the value of the OPCODE_X in a shift register 351 only when the REQUEST_VALID_X is "1", receives the OPCODE_Y and the REQUEST_VALID_Y from an operation controller 341, and records the value of the OPCODE_Y in a shift register 353 only when the REQUEST_VALID_Y is "1"

Figure 15:
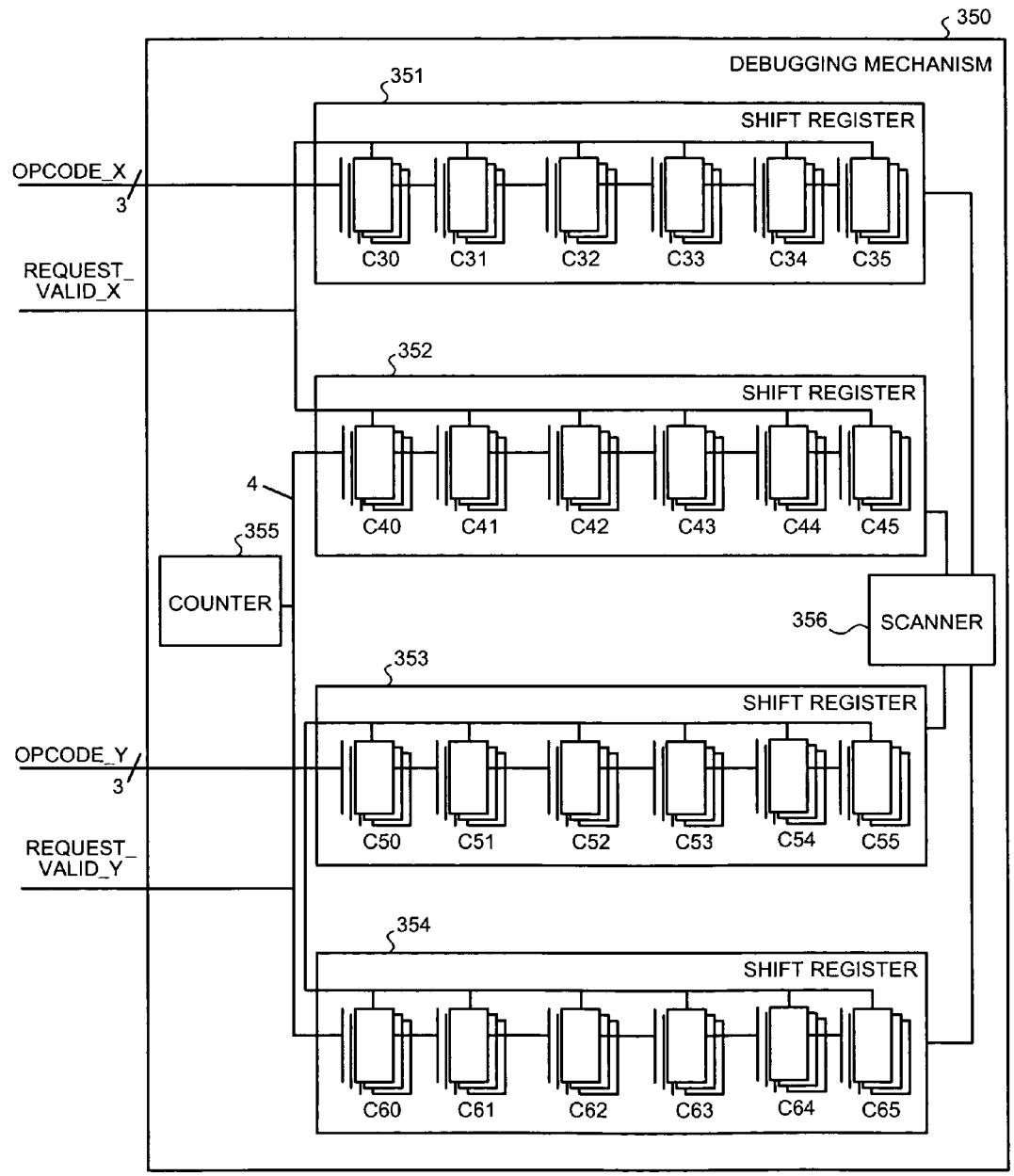
FIG. 15 is a block diagram of a debugging mechanism according to the third embodiment.

FIG. 15 is a block diagram of a debugging mechanism 350 according to the third embodiment. As shown in the diagram, the debugging mechanism 350 has the shift registers 351 to 354, a counter 355, and a scanner 356.

The shift register 351 receives the OPCODE_X and the REQUEST_VALID_X and stores the value of the OPCODE_X only when the REQUEST_VALID_X is "1". The shift register 353 receives the OPCODE_Y and the REQUEST_VALID Y and stores the value of the OPCODE_Y only when the REQUEST_VALID_Y is "1".

The counter 355 is a 4-bit counter that cyclically counts H'0' to H'F' every cycle, and is used to specify the timing at which the OPCODE_X or the OPCODE_Y is recorded.

The shift register 352 stores the value of the counter 355 only when the REQUEST_VALID_X is "1" or at the timing when the OPCODE_X is recorded in the shift register 351. The shift register 354 stores the value of the counter 355 only when the REQUEST_VALID_Y is "1" or at the timing when the OPCODE_Y is recorded in the shift register 353. The scanner 356 scans and reads the values stored in the shift registers 351 to 354.

It is assumed herein that the OPCODE_X and the REQUEST_VALID_X have been sent to the operation unit X330 from the command control unit 310 and that the OPCODE_Y and the REQUEST_VALID_Y have been sent to the operation unit Y340 at timings as shown in FIG. 16. The values of the OPCODE_X and the counter values held then in the shift registers 351 and 352 in the debugging mechanism 350, the values of the OPCODE_Y and the counter values held then in the shift registers 353 and 354, and their timings are shown in FIG. 17.

As shown in FIG. 17, the values of the OPCODE_X at "TIM 0", "TIM-1", "TIM-3", "TIM-5", "TIM-8", and "TIM-9" when the REQUEST_VALID_X is "1" are recorded in the shift register 351, and the counter values at "TIM 0", "TIM-1", "TIM-3", "TIM-5", "TIM-8", and "TIM-9" are recorded in the shift register 352. The values of the OPCODE_Y at "TIM 0", "TIM-2", "TIM-4", "TIM-5", "TIM-6", and "TIM-8" when the REQUEST_VALID_Y is "1" are recorded in the shift register 353, and the counter values at "TIM 0", "TIM-2", "TIM-4", "TIM-5", "TIM-6", and "TIM-8" are recorded in the shift register 354.

Therefore, designers can recognize that the valid signals OPCODE_X have been sent from the command control unit 310 in the order of ADD→SQRT→SUB→MULT→DIV→ADD over the past ten cycles, and operations have been performed in the operation executing unit 332 in the operation unit X330 by examining the values recorded in the shift registers 351 and 352 in the debugging mechanism 350, and can recognize that the valid signals OPCODE_Y have been sent from the command control unit 310 in the order of ADD→MULT→SHIFT_LEFT→ADD→MULT→SHIFT_LEFT over the past nine cycles, and operations have been performed in the operation executing unit 342 by examining the values recorded in the shift registers 353 and 354.

Since the counter values recorded in the shift registers 352 and 354 are common to the operation units X330 and Y340, designers can recognize the timings of operations performed by both operation units from the recorded values, further improving the debugging efficiency. For example, designers can recognize that the operation units X330 and Y340 have been executing operations simultaneously at "TIM 0", "TIM-5", and "TIM-8".

As described above, since the debugging mechanism 350 records operations performed by the two operation units and designers can recognize the timings for the operations performed by both operation units according to the third embodiment, the debugging efficiency can further be improved.

Although the processor has two operation units in the third embodiment, the invention can be adapted to a processor that has more operation units by increasing the number of shift registers in the debugging mechanism.

An example of examining the sequential transition of a determined signal in a processor is explained in the first to the third embodiments. However, sometimes it is required to select one signal from a plurality of signals in a processor and examine the sequential transition of that signal. An example of selecting either one of two signals in a processor and recording the selected signal in a shift register will be explained in a fourth embodiment of the present invention.

Figure 18:
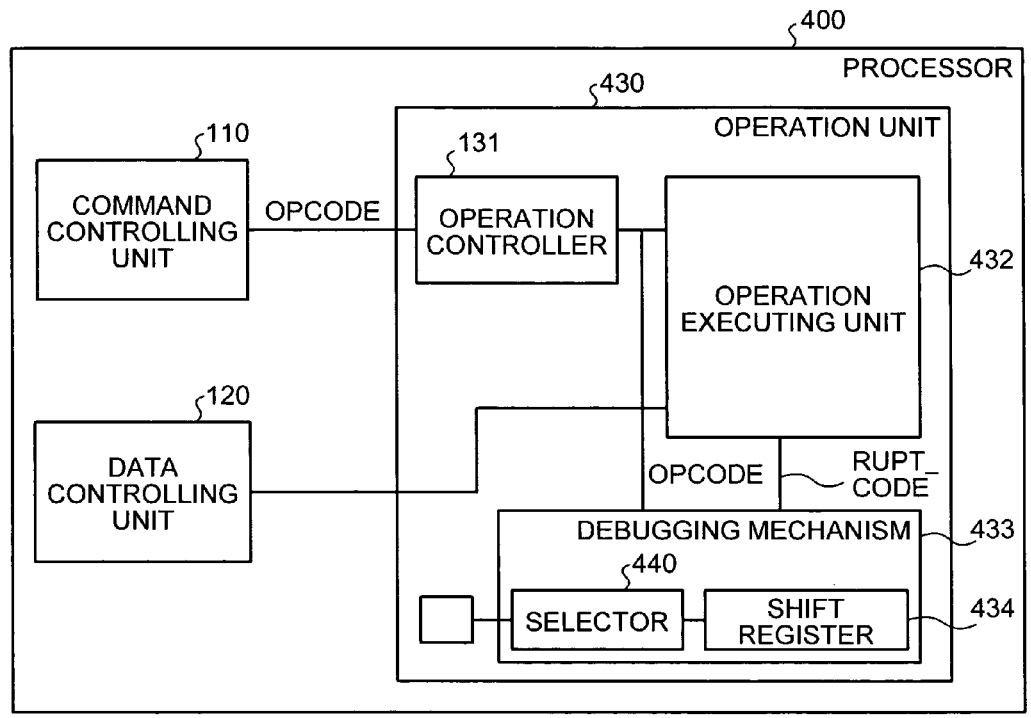
FIG. 18 is a block diagram of a processor according to a fourth embodiment of the present invention.

FIG. 18 is a block diagram of a processor 400 according to the fourth embodiment. For the sake of descriptive convenience and to avoid the redundant detailed description, in FIG. 18, like reference numerals designate like functional parts as those shown in FIG. 2.

As shown in the diagram, an operation unit 430 of a processor 400 has an operation controller 131, an operation executing unit 432, and a debugging mechanism 433.

The operation executing unit 432 performs an operation according to a control signal from the operation controller 131, and sends a signal RUPT_CODE to the debugging mechanism 433. The RUPT_CODE is a 3-bit signal indicating the status of the result of an operation.

The debugging mechanism 433 provides a function of assisting debugging of the processor 400, and records either the OPCODE or the RUPT_CODE in the shift register based on a selection signal. The selection signal is an output of a latch that can be scanned, and can be set from outside the processor 400.

Figure 19:
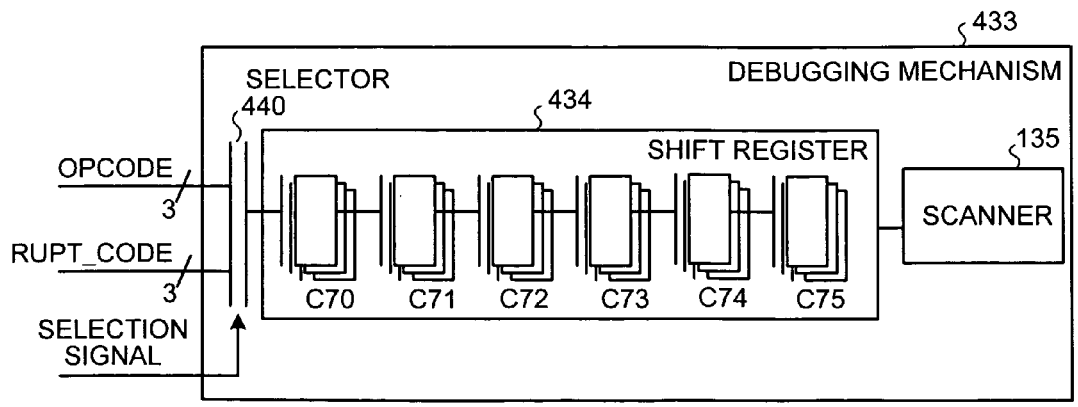
FIG. 19 is a block diagram of a debugging mechanism according to the fourth embodiment.

FIG. 19 is a block diagram of a debugging mechanism 433 according to the fourth embodiment. As shown in the diagram, the debugging mechanism 433 has a shift register 434, a selector 440, and a scanner 135.

The shift register 434 stores the values of the OPCODE or the RUPT_CODE over the past six cycles. The selector 440 receives the OPCODE, the RUPT_CODE, and the selection signal, selects the OPCODE or the RUPT_CODE based on the selection signal, and sends the selected one to the shift register 434. That is, the shift register 434 stores the values of the OPCODE or the RUPT_CODE, selected by the selector 440, over the past six, cycles.

As described above, in the fourth embodiment, since the selector 440 selects the OPCODE or the RUPT_CODE and the shift register 434 stores the values of the selected OPCODE or the RUPT_CODE over the past six cycles, the types of recordable signals can be increased with a slight increase in the quantity of hardware.

Although an example in which the REQUEST_VALID is not used is explained in the fourth embodiment, the REQUEST_VALID may be used so that the OPCODE or the RUPT_CODE can be recorded in the shift register only when the value of the REQUEST_VALID is "1".

Since a designer can arbitrarily determine the number of signals to be recorded in the debugging mechanism, the number of clocks, and the bit width of the counter according to the first to the fourth embodiments based on the amount of circuitry that can be provided in a processor and the necessity, the circuit scale of the debugging mechanism can be minimized as needed by the designer as contrast to the circuit scale of a RAM that can be provided only in a certain unit, such as 1 Kb or 2 Kb.

According to the present invention, designers can recognize the sequential transition of signals in a processor, thus ensuring efficient debugging of the processor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A processor debugging apparatus in a debugged processor executing a plurality of operation codes, the processor debugging apparatus comprising:
    an operation controller that controls the executing of the plurality of operation codes by the debugged processor and generates a valid signal associated with the executing;
    a shift register that stores the plurality of operation codes executed in the debugged processor for multiple clock cycles when the valid signal is inputted into the shift register from the operation controller;
    a signal reading unit that scans and reads out the values of the executed operation codes in the shift register;
    a timing designating unit that designates a timing for storing each of the executed operation codes in the shift register; and
    a timing memory unit that stores a timing value for identifying a timing designated by the timing designating unit, in association with each of the executed operation codes to be stored in the shift register.

2. The processor debugging apparatus according to claim 1, further comprising:
    an operation codes selecting unit that selects executed operation codes from a plurality of executed operation codes in the debugged processor, wherein
    the shift register stores a plurality of executed operation codes selected by the executed operation codes selecting unit over multiple clock cycles.

3. The processor debugging apparatus according to claim 1, wherein the timing value to be stored in the timing memory unit is a counter value counted by a counter.

4. The processor debugging apparatus according to claim 1, further comprising:
    a counter that outputs counted values for multiple clock cycles; and
    a second shift register that stores a plurality of counted values outputted from the counter for multiple clock cycles, wherein the second shift register stores the counted value when the valid signal is inputted in the second shift register.

5. The processor debugging apparatus according to claim 4, wherein the signal reading unit scans and reads out the counted values stored in the second shift register.

6. A processor debugging method for a debugged processor executing a plurality of operation codes, the processor debugging method comprising:
    controlling the executing of the plurality of operation codes by the debugged processor;
    generating a valid signal associated with the executing;
    storing a plurality of executed operation codes into a shift register for multiple clock cycles when the valid signal generated at the generating is inputted into the shift register;
    scanning and reading out the plurality of executed operation codes stored in the shift register; and
    recording a timing value for identifying a timing in association with each of the executed operation codes to be stored in the shift register.

7. The processor debugging method according to claim 6, further comprising selecting executed operation codes from a plurality of operation codes executed in the debugged processor, wherein the storing includes storing a plurality of executed operation codes selected at the selecting over multiple clock cycles.

8. The processor debugging method according to claim 6, wherein the timing value to be stored at the recording is a counter value counted by a counter.

9. The processor debugging method according to claim 6, further comprising:
   storing a counted value of a counter into a second shift register that stores a plurality of predetermined values for multiple clock cycles when a valid signal is inputted into the second shift register; and
   scanning and reading out the counted values stored in the second shift register.

10. A processor debugging method for a processor executing a plurality of operation codes, the processor debugging method comprising:
    controlling the executing of the plurality of operation codes by the debugged processor;
    generating a valid signal associated with the executing;
    storing a plurality of executed operation codes into a shift register for multiple clock cycles when the valid signal generated at the generating is inputted into the shift register; and
    executing a debugging operation by determining sequential transition statuses of the plurality of executed operation codes over the multiple clock cycles by reading the plurality of executed operation codes stored in the shift register.

11. The processor debugging method according to claim 10, further comprising:
    storing a counted value of a counter into a second shift register that stores a plurality of predetermined values for multiple clock cycles when a valid signal is inputted into the second shift register; and
    executing a debugging operation by determining sequential transition statuses of the signal over the multiple clock cycles by reading the counted values stored in the second shift register.

12. The processor debugging method according to claim 10, wherein information over the multiple clock cycles is stored in the shift register when a predetermined value is selectively assigned to the signal.

13. The processor debugging method according to claim 10, wherein a designer determines one or more of a number of signals to be recorded in the shift register, a number of the multiple clock cycles and a bit width of a counter relative to the debugging operation.

\* \* \* \* \*